(12) United States Patent
Goux (10) Patent No.: US 8,799,024 B2
(45) Date of Patent: Aug. 5, 2014

(54) SYSTEM AND METHOD FOR IMPROVING THE OPERATION OF A BUSINESS ENTITY AND MONITORING AND REPORTING THE RESULTS THEREOF

(76) Inventor: Timothy Gayle Goux, Mandeville, LA (US)

( * ) Notice: Subject to any disclaimer, the term of this patent is extended or adjusted under 35 U.S.C. 154(b) by 912 days.

(21) Appl. No.: 12/043,619

(22) Filed: Mar. 6, 2008

(65) Prior Publication Data

US 2008/0154653 A1     Jun. 26, 2008

Related U.S. Application Data (63) Continuation of application No. 10/044,581, filed on Oct. 23, 2001, now Pat. No. 7,346,524.

(51) Int. Cl.
*G06Q 50/00* (2012.01)

(52) U.S. Cl.
USPC .................................. 705/4; 705/2; 705/3

(58) Field of Classification Search
USPC .................................................. 705/1–4
See application file for complete search history.

(56) References Cited

U.S. PATENT DOCUMENTS

| | | | |
|---|---|---|---|
| 4,942,527 A | 7/1990 | Schumacher | |
| 4,975,840 A | 12/1990 | Detore et al. | |
| 5,172,313 A | 12/1992 | Schumacher | |
| 5,947,747 A | 9/1999 | Walker et al. | |
| 6,035,276 A * | 3/2000 | Newman et al. | 705/2 |
| 6,119,097 A | 9/2000 | Ibara | |
| 6,862,571 B2 * | 3/2005 | Martin et al. | 705/4 |
| 7,346,524 B2 | 3/2008 | Goux | |
| 7,904,326 B2 * | 3/2011 | Gharavy | 705/317 |
| 2001/0027455 A1 | 10/2001 | Abulleil et al. | |
| 2001/0031457 A1 | 10/2001 | Pfenninger et al. | |
| 2002/0016847 A1 | 2/2002 | Soldis | |
| 2002/0029158 A1 | 3/2002 | Wolff et al. | |
| 2002/0055862 A1 | 5/2002 | Jinks | |
| 2002/0087364 A1 * | 7/2002 | Lerner et al. | 705/4 |
| 2003/0050794 A1 * | 3/2003 | Keck | 705/2 |
| 2004/0024618 A1 * | 2/2004 | Martin et al. | 705/2 |
| 2005/0137915 A1 * | 6/2005 | Martin et al. | 705/4 |
| 2005/0273370 A1 * | 12/2005 | Udell et al. | 705/4 |

(Continued)

OTHER PUBLICATIONS

Arden Financial Services, There is a New Way to Shop for Insurance, http://www.ardenfinancial.com/docs/cgi/express_quote, Oct. 12, 2001, see website.

(Continued)

*Primary Examiner* — Hiep V Nguyen
*Assistant Examiner* — Teresa Woods
(74) *Attorney, Agent, or Firm* — Troutman Sanders, LLP; James E. Schutz; Jay R. Anderson, Jr.

(57) ABSTRACT

The present invention is a method and system for providing reduced insurance premiums to an insured entity and a reduced risk of loss to an insuring entity. A program containing certain program requirements for the insured entity is created, and procedures are designed for the insured entity to meet these predetermined program requirements. The proximity in meeting these program requirements are monitored and then communicated to an interested third party, such as the insurer. Thus, the present invention by monitoring the insured entity, and communicating information relating to the insured entity to the insuring entity, allows the insuring entity to reduce the insurance costs to the insured entity if such monitoring results in favorable information for the insurer.

19 Claims, 4 Drawing Sheets

(56) References Cited

U.S. PATENT DOCUMENTS

| | | |
|---|---|---|
| 2006/0074708 A1* | 4/2006 | Woods ............................. 705/2 |
| 2006/0282286 A1* | 12/2006 | Faris et al. ...................... 705/2 |
| 2007/0011024 A1* | 1/2007 | Dale et al. ....................... 705/2 |
| 2007/0250351 A1* | 10/2007 | Szlam ............................. 705/4 |
| 2008/0046296 A1* | 2/2008 | Frick ............................... 705/3 |
| 2008/0059292 A1* | 3/2008 | Myers et al. ................... 705/11 |

OTHER PUBLICATIONS

BSGC Business Strategy Group Consulting, Insurance and Healthcare Services Descriptions, BSGC http://www.bsgc.net/ins-strat.html, May 7, 2001, see website.

International Preliminary Examination Report in connection with related International Application No. PCT/US01/49935.

* cited by examiner

SYSTEM AND METHOD FOR IMPROVING THE OPERATION OF A BUSINESS ENTITY AND MONITORING AND REPORTING THE RESULTS THEREOF

RELATED APPLICATION

This application is a continuation of U.S. patent application Ser. No. 10/044,581 filed on Oct. 23, 2001 and entitled "A SYSTEM AND METHOD FOR IMPROVING THE OPERATION OF A BUSINESS ENTITY AND MONITORING AND REPORTING THE RESULTS THEREOF," and claims the benefit of the filing date for the same.

TECHNICAL FIELD

This invention relates to the field of insurance contracting and, more particularly to the field of providing a business model that effectively allows the provision of reduced insurance premiums and reduced risk of loss.

BACKGROUND OF THE INVENTION

The insurance industry is religiously governed by the law of averages. To be profitable, insurance companies must sell policies at premiums that will exceed the cost necessary to cover expected claims and operating expenses. Identifying the operating expenses for the insurance company is basic business management. However, identifying the expected claims that will arise from an insurance company's client base is a complex task. The typical insurance company has a team of actuarial scientist that pour through statistics, cost curves, trends, risk assessments, and a pocket protector full of other variables in an effort to accurately identify the risk of loss associated with particular client profiles or genres. Too many ill conceived projections can drag an insurance company into bankruptcy.

Thus, the insurance company is met with at least two competing interests or goals. On one hand, it needs to guaranty the reception of premiums adequate to keep the company profitable. On the other hand, the insurance company needs to offer price competitive programs that will attract a large number of clients. If the premiums for the insurance programs are set too low, the insurance company runs the risk of becoming cash poor. If the premiums for the insurance programs are set too high, the insurance company may not be able to attract enough clients to make the program worth while. The optimum scenario is to provide competitively priced programs to low risk clients. Therefore, there is a need in the art for a technique to help reduce the premiums of an insurance program while at the same time, reducing the risk attributed to insuring a particular entity.

The health care provider industry heavily relies on the insurance industry. Of particular interest is the long-term health care industry, such as nursing homes, elderly homes or the like. During the 1998 to 2000 time-frame, these long-term health care providers experienced insurance premium increases as high as 350% per year. One reason that these escalating premiums can be attributed to is the high-risk nature of the business. The number one claim levied against long-term health care providers are fall claims. In addition, wound care claims, such as bed sores, result in multimillion dollar judgments against the health care provider. These judgments are ultimately paid by the insurance companies.

The insurance risk of long-term health care providers dramatically increased with the implementation of the new Medicare system. When initially implemented, the rates offered by the Medicare system were drastically insufficient to meet the cost of the services provided. As a result, it was necessary for many long-term health care providers to reduce their nursing staff and to cut corners in obtaining proper medical equipment and supplies. Although corrective reimbursement changes have been made, this industry is still plagued with a high turnover rate of clinical and support personnel. The high turnover rate directly has an effect on the number of incidents that occur in such a long-term health care provider establishment.

High-risk entities, such as long-term health care providers are stuck in a "catch 22" situation. The providers cannot afford to provide the level of service necessary to reduce their insurability risks. Because of the high risk, the insurance premiums for such entities continue to escalate which results in increasing the insurability risk of the entity. Thus, there is a need in the art for a technique to help reduce the insurability risk of a long-term health care provider and to reduce the insurance premiums charged to the same.

Similar to the long-term health care industry, many other industries are also plagued by escalating insurance premiums do to their high-risk status. Thus there is a need in the art for a general technique that can help reduce the insurability risk of an entity and to provide affordable and profitable insurance programs to the entities.

SUMMARY OF THE INVENTION

The present invention satisfies the above needs by providing a method and a system that operate to (a) reduce the insurability risk of an insured entity, (b) reduce the insurance premiums for insurance programs, (c) increase the profitability of the insuring entities by decreasing the probability of incident claims being levied against the insured entity, and (d) reduce the overall risk factors in the health care industry, or other industry, being serviced by another entity to improve operations.

The present invention formulates a program for the insured entity that contains various program requirements. Procedures designed for the insured entity to meet the program requirements are implemented and monitored to identify the proximity of the insured entity meeting the program requirements. Once the present invention calculates the proximity of the insured entity meeting these program requirements, the proximity is communicated to an interested third party, such as the insurer. Thus, the present invention by monitoring the insured entity, and communicating information relating to the insured entity to the insuring entity, allows the insuring entity to reduce the insurance costs to the insured entity if such monitoring results in favorable information for the insurer. One embodiment of the present invention is a method for providing improved performance of a target entity. This embodiment of the present invention operates to formulate a program containing program requirements; implement procedures designed for the target entity to meet the program requirements; monitor the results of the procedures to identify the proximity of the target entity meeting the program requirements; and communicate the proximity to an interested third party. Formulating the program can involve a single insurer or several insurance providers cooperating to underwrite the insurance program. As the results of the procedures are monitored, this embodiment may also provide for a feedback mechanism of these results. This feedback mechanism enables the effectiveness of the procedures to be evaluated and then modified if necessary. The proximity of the target entity, ore the measurement of how closely the target entity is meeting the requirements, may be communicated to third parties by attributing a score to the monitored results; and providing the score to the interested third party. The score may be a numerical value indicating conformance of the target entity to the program requirements, or it may be some other weighted mechanism.

The present invention also operates to reduce insurance premiums for an insurance program or product. This is accomplished by first formulating an insurance program containing predetermined program requirements. Next, procedures designed for the insured entity to meet the program requirements are implemented. The results or effectiveness of the procedures are monitored to identify the proximity of the insured entity meeting the program requirements. The proximity of the insured entity meeting the program requirements is identified and a score is attributed to the monitored results. Finally, this score is provided to the insuring entity. The insuring entity can then implement/modify procedures to improve the score. As the score improves, the insurance premiums can be reduced to reflect the decrease in the risk of payout.

One embodiment of the present invention includes a system for providing improved performances for a target entity. The system includes an independent program catalyst and a web-enabled software solution. The independent program catalyst identifies program requirements, implements procedures directed towards assisting the target entity in meeting the program requirements, monitors the results of the target entity to identify the proximity to meeting the program requirements, and attributes a score to the monitored results. The web-enable software solution provides the monitoring results and the scores to the target entity, the independent program catalyst and an interested third party.

DETAILED DESCRIPTION

Referring now to the figures in which like numerals refer to like elements throughout the several views, various embodiments and aspects of the present invention are described. The present invention provides a system and method and business model for providing reduced-cost and cost-effective insurance programs, and has been described in relation to particular embodiments which are intended in all respects to be illustrative rather than restrictive. Those skilled in the art will understand that the principles of the present invention may be applied to, and embodied in, various program modules for execution on differing types of computers and/or equipment, operating in differing types of networks, regardless of the application. Although the business model of the present invention has been described as being integrated within an insuring entity, it should be understood that the business model of the present invention can actually exist independent of an insuring entity. In addition, the present invention has been described as being interactive with a user; however, those skilled in the art will appreciate that the user interface may also be substituted with a computer or machine interface.

Figure 1:
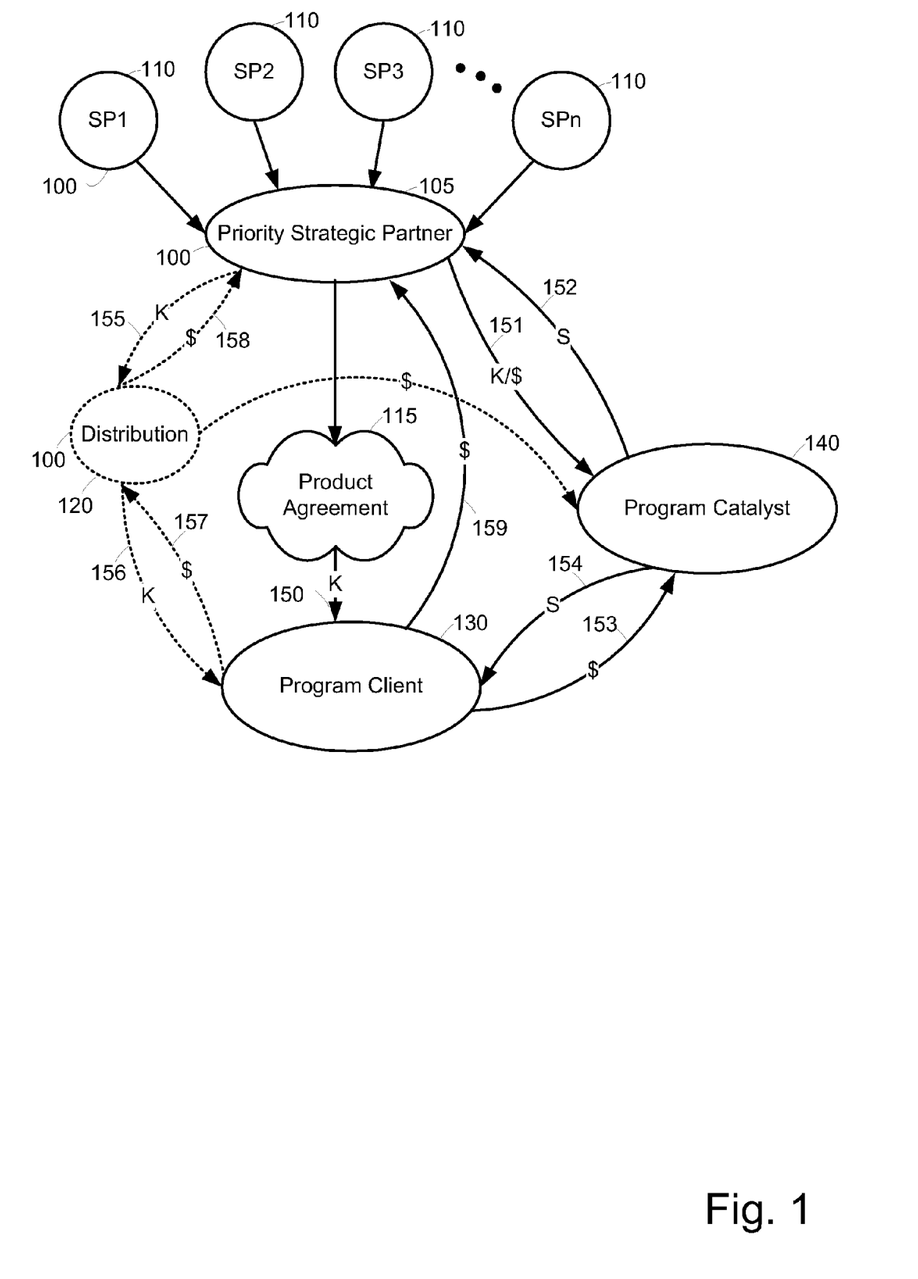
FIG. 1 is a functional block diagram illustrating an exemplary embodiment of the business model of the present invention.

FIG. 1 is a functional block diagram illustrating an exemplary structure of the business model of the present invention. The business model includes three entity classes: strategic partners 100, program catalysts 140, and program clients 130. The strategic partners include one or more entities that cooperatively, or independently, provide contractual programs 115 to program clients 140. Examples of such programs include, but are not limited to, life, health, product liability or other insurance programs, warranty programs, malpractice liability and maintenance programs. As illustrated in FIG. 1, the strategic partners 100 include multiple strategic partners 110, a priority strategic partner 105 and distribution 120.

The program clients 130 may include a variety of entities and the present invention is not limited to any particular entity or class of entities. However, examples of program clients 130 are provided within the specification and each such provision is to be intended for illustrative purposes only and is not intended to be restrictive or to limit the scope of the present invention. A few examples of program clients 130 include a health care provider, an individual person, a building owner, a vehicle owner, individual entity/corporation or the like.

The program catalyst 140 operates to assist the program clients 130 in meeting the obligations and requirements of the program. The obligations and requirements of the program may be set by the program catalyst 140 based on its experience and expertise, the strategic partners 100, and even in some cases, the program clients.

The business model of the present invention allow the strategic partners 100, operating independently or in conjunction with a program catalyst 140, to create programs to be offered to the program clients 130. One a program 115 is in place, the program catalyst 140 works with the program client 130 to ensure that certain obligations, requirements, performance standards, or the like are being met. The program catalyst 140 then utilizes a web-enabled, proprietary software reporting system to provide instantaneous feedback to the strategic partners 100 and/or the program clients 130 regarding the performance of the program 115. However, it should be understood that the Program catalyst is not required to utilize the reporting system but rather, this activity simply comprises one inventive aspect.

Figure 2:
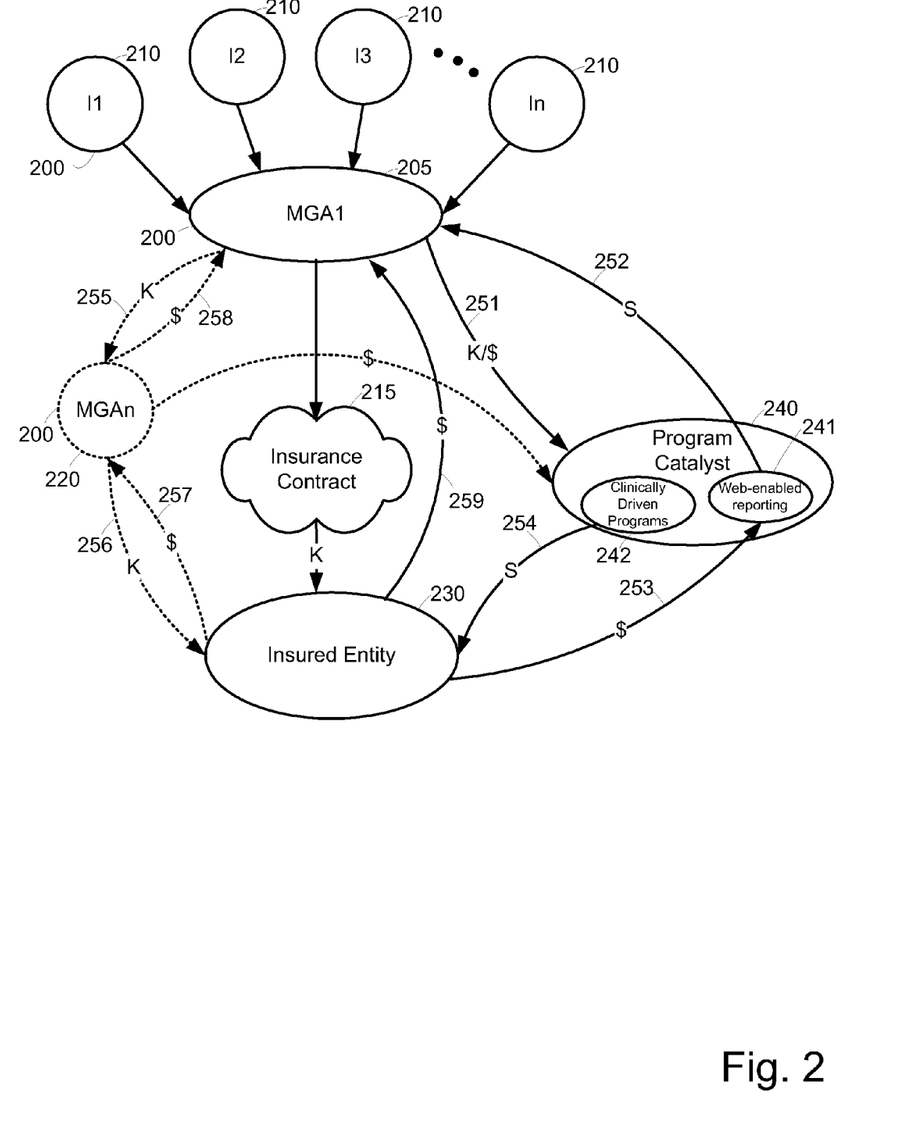
FIG. 2 is a functional block diagram illustrating an exemplary embodiment of the business model of the present invention.

FIG. 2 is a functional block diagram illustrating an exemplary embodiment of the business model of the present invention. In this embodiment, the operation of the business model of the present invention is illustrated in the provision of an insurance program offered to a long-term health care provider is illustrated. The strategic partners in this embodiment include entities that provide or are affiliated with the insurance industry "insuring entities" 200. The program clients in this embodiment include insured entities 230.

The insuring entities 200 include insurance providers 210, authorizing or initiating brokers (MGA1) 205 and managing general agents ("MGAs") 220. The insured entities 230 may include a variety of entities and the present invention is not limited to any particular entity or class of entities; however, for this example, the insured entity 230 is a long-term health care provider, such as a nursing home. The program catalyst 240 operates to assist the insured entity 230 in meeting the obligations and requirements of the insurance program offered by the insuring entities 200.

Insuring entities 200 typically provide multiple insurance programs from which a potential insured entity 230 can select. Under the business model of the present invention, at least one of these insurance programs is offered at a reduced premium, and in exchange for the reduced premium, the services of the program catalyst 240 are employed. The program catalyst 240 works closely with the insured entity 230 and provides a program management and risk management function. The program catalyst 230 also works closely with the insuring entities 200 to provide program feedback intended to assist the insuring entities 200 in the administration of the insurance program. Thus, the program catalyst may include the provision of clinically driven programs 242 in one embodiment and web-enabled reporting 241 in another embodiment, or yet in even another embodiment, both.

Figure 3:
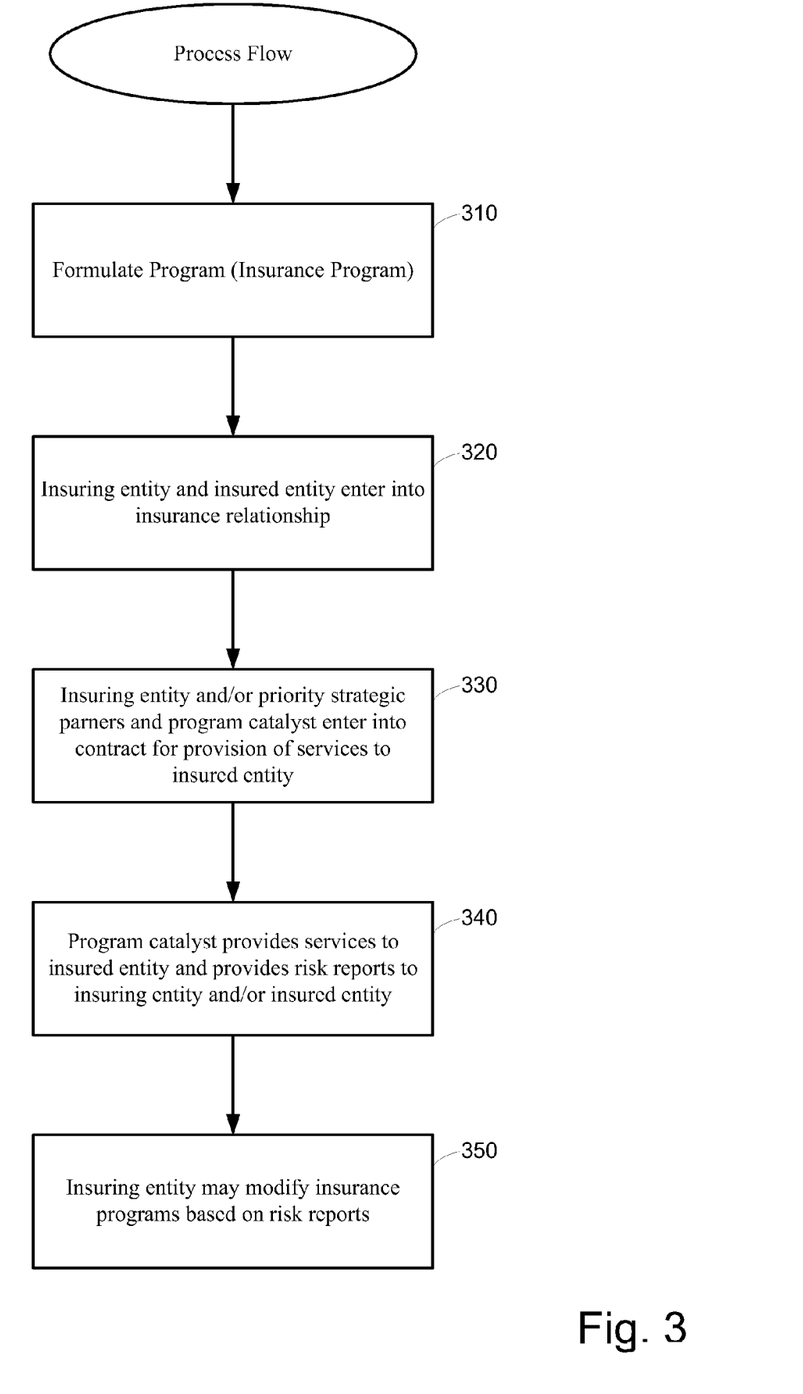
FIG. 3 is a flow diagram illustrating the steps and procedures that are involved in the exemplary implementation of the present invention illustrated in FIG. 1

FIG. 3 is a flow diagram illustrating the steps and procedures that are involved in the exemplary implementation of the present invention illustrated in FIG. 1. Initially an insurance program is formulated 310. The result of this process is a insurance contract or program 215 that can be subscribed to our purchased by a potential program customer—the insured entity 230. Several techniques including various participants may be employed in this process and the present invention is not limited to any particular technique. In one embodiment, several insurance providers are pooled together to underwrite the insurance program. This technique advantageously allows the risk associated with the insurance to be diluted by spreading any losses to all of the pooled insurers. Those skilled in the art and knowledgeable about the insurance industry will realize that this is simply one technique that can be used to create the insurance program. In other embodiments, a single insurer may offer the program.

Once the insurance program is formulated 310, the insuring entities 200 and one or more potential insured entities 230, enter into insurance relationships 320. This procedure may be conducted in a variety of manners and the present invention is not limited to any particular manner. Rather, the present invention is only dependent upon ultimately establishing an insurance relationship between the insured entity 230 and an insuring entity 200. In the embodiment illustrated in FIG. 2, the insurance program can be sold to a potential insured entity 230 either directly 250 or through a managing general agent ("MGA") 220 255 256. In the first instance, the insured entity 230 pays insurance premiums to the insuring entity 205 259. In the second instance, the insured entity 230 pays insurance premiums to the MGA 220 258 and the MGA 220 provides payment to the authorizing or initiating brokers 205 258.

An additional step that must be performed is the creation of a relationship between the insuring entity 200 and the program catalyst 240 330. The program catalyst can take on a variety of forms and the present invention is not limited to one particular form nor to the examples provided herein. In one embodiment, the program catalyst 240 is a service company that provides services to the insured entity 200 on behalf of the insuring entity 230. As an example, if the insured entity 230 is a long-term health care provider, the program catalyst may provide risk management/assessment services to help reduce the number of incidents within the facilities of the insured entity 230.

In the preferred embodiment, directed toward the health care industry, an exemplary program catalyst 240 can utilize the latest technologies and techniques to reduce the risk of accidents occurring in the health care arena. These efforts can be directed towards fall prevention, wound care, documentation guidelines, nutritional issues, security issues, pharmacy/drug programs, sexual harassment programs, or the like. Advantageously, the program catalyst 240 of the preferred embodiment of the present invention utilizes licensed clinicians and nurse managers to provide the risk management/assessment services.

The relationship between the insuring entity 200 and the program catalyst 240 may take the form of a services contract under which the program catalyst 240 is paid for services rendered. Alternatively, the business model of the present invention also anticipates that the program catalyst 240 may enter into an agreement with the insured entity 230 for the provision of the services. In yet another alternate embodiment, the program catalyst 240 and the insuring entity 200 may be the same entity. In yet another embodiment, the program catalyst 240 may be an integral part of the insured entity 230. In yet another embodiment, the program catalyst 240 may enter into an agreement with the priority strategic partner—the MGA1 205.

Regardless of which of the above-described embodiments are utilized, at step 340 the program catalyst 240 provides services to the insured entity 230 and then provides a reporting service to the insuring entity 200 and/or the insured entity 230. In the preferred embodiment, a web-based and/or a web-enabled software solution is utilized by the program catalyst 240 in providing these services. Periodically (i.e., once per week, month, etc.), a member of the program catalyst 240 team (i.e., a nurse manager) will utilize the software solution to address the key factors of the risk management program. Based on the input from the program catalyst 240 team member, scoring data for relevant issues are generated. This scoring data identifies a relevant issue in the applicable industry and attaches a performance score to indicate the insured entity's conformance or adherence to operational requirements associated with this issue. In one embodiment, a value of 1 is assigned for poor performance and a 5 is assigned for excellent or above standard performance. These scores are a compilation of many factors, scored/measured on any particular subject matter within the program. Advantageously, the web-based software solution enables the program catalyst 240 to generate and deliver to pertinent parties in a timely and expedient manner.

Finally the insuring entity 200 can utilize the provided reports to modify, enhance or cancel insurance programs 350. Based on the reported performances of the insured entities 230, weak points and strong points can be identified. For the weak points, countermeasures can be employed, either directly or through the program catalyst to further reduce the amount of risk. The program catalyst 140 also provides access to the web-enabled software solution so that it serves as key and primary communication tool between the program catalyst 240 and the insuring entities 200. In addition, the program catalyst 240 can also provide training services to the insured entity 230. The training services instruct the insured entity regarding procedures and operations to help them attain a high scores.

Although the business model of the present invention has been described as being integrated within an insuring entity, it should be understood that the business model of the present invention can actually exist independent of an insuring entity. As an independent business model, the present invention provides an entity that provides special and skilled services to particular entity. The provision of these special and skilled services from an independent party are focused on the attainment of certain goals and objectives for the particular entity that are either established by the particular entity or some other third party. The entity providing the special and skilled services also employs the use of a web-enabled software solution that provides feedback pertaining to progress made toward reaching the goals and objectives. This feedback is provided through the web-enables software as a score system. The score system identifies the particular issues pertaining to the attainment of the goals and then provides a score to indicate the progress made in attaining the goal.

Figure 4:
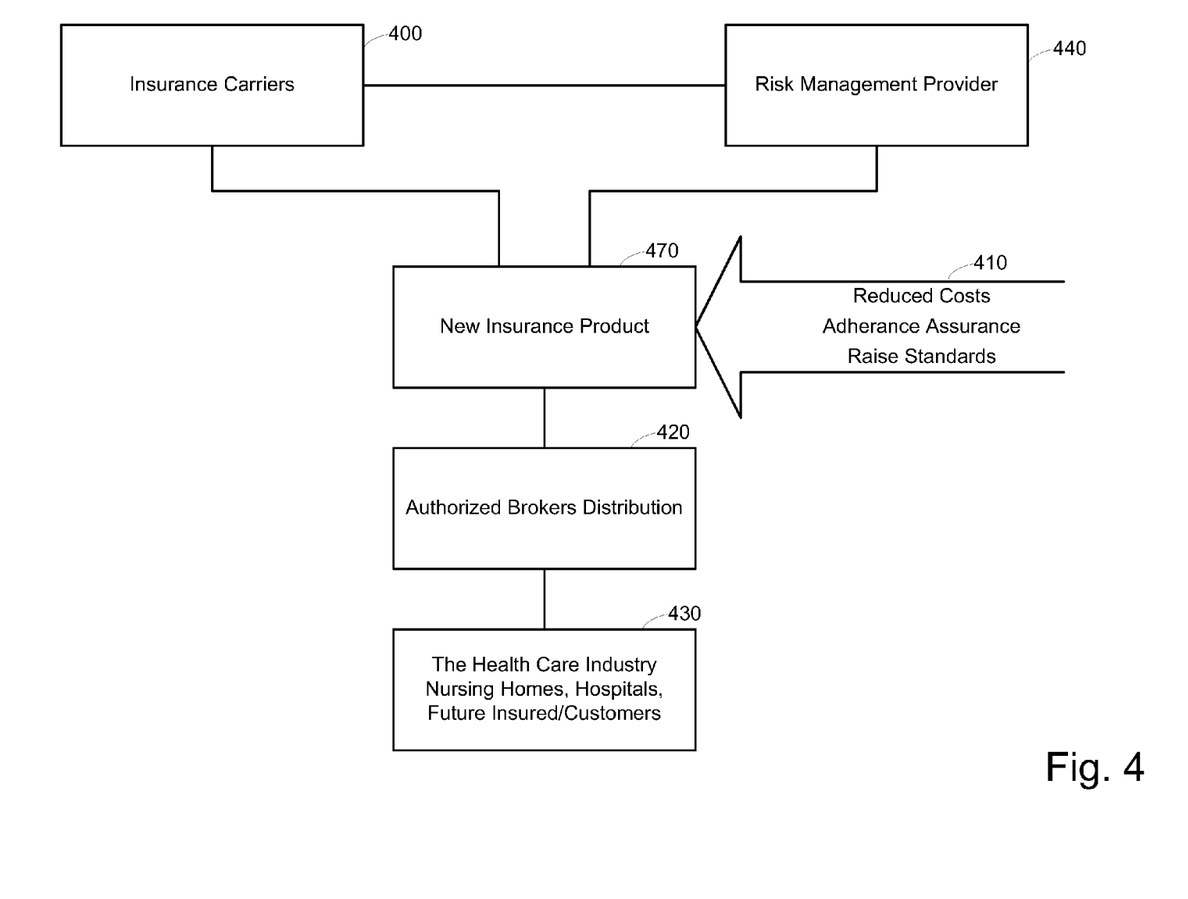
FIG. 4 is a functional block diagram illustrating one specific application of the present invention.

FIG. 4 is a functional block diagram illustrating one specific application of the present invention. In this embodiment, the risk management provider 440 teams up with one or more insurance carriers 400 to create a new insurance product 470. This new insurance product 470 provides multiple benefits such as reduced premiums, reduced risk of claims through providing adherence assurances, and increased standard in providing services by the insured. The new insurance product 470 is then distributed through authorized brokers distribution 420, or some other distribution channel, to entities in the health care industry 430, such as nursing homes, hospitals, future insured/customers. In providing the feedback, the risk management provider 440 will provide a program directed towards meeting a particular standard. The standard will be the score for compliance measurement that will be a mandate with the new insurance product 470. These scores are communicated to the insurance carriers 100 at intervals of their request (i.e., monthly). The scores are also sent to the insured client/health care facility.

Under this application, the program catalyst 140 provides skilled clinical delivery of holistic risk management programs, coupled with the use of a proprietary, web-enabled software solution to provide scores/measurements of the performance under the programs. Advantageously, this application of the present invention assists in providing a higher level of care to patients. In addition, this application of the present invention provides cost and performance benefits to health care facilities and insurance companies/carriers. Thus, the business model of the present invention can be utilized to provide holistic clinically-driven risk management programs that facilitates bring two major industries together creating great opportunities, and equally important, to raise the standard of care within the health care industry.

Under this application of the present invention, it is readily observed that the program catalyst or the risk management provider 340 can easily modify its program to best suit the needs of the partners that rely on the business model. For instance, the risk management/assessment program may be customized to meet the specific requirements of various insurance policies, or to adjust the program to best suit the environment within which the health care provider is located. For example, the program may be adjusted to accommodate large amounts of inclement weather, multiple floors with steps, or particular characteristics of the patients and staff.

Alternate embodiments will become apparent to those skilled in the art to which the present invention pertains without departing from its spirit and scope. Accordingly, the scope of the present invention is described by the appended claims and supported by the foregoing description.

What is claimed is:

1. A computer program product embodied in a non-transitory computer readable medium, the computer program product comprising an algorithm adapted to effectuate a method for providing improved performance of an insured healthcare facility, the method comprising:
identifying a risk reduction program designed to reduce risks of accidents associated with the healthcare industry;
providing a reduced-cost insurance program in return for a healthcare facility's contractual participation in the risk reduction program;
receiving results of a risk reduction program monitor to identify conformance of the healthcare facility with requirements of the risk reduction program;
attributing a numerical score to the results of the risk reduction program, the numerical score indicating the conformance of the healthcare facility to the risk reduction program;
providing the numerical score to an interested third party; and
modifying the insurance program based on the received results of the risk reduction program monitor, wherein the modification comprises modifying the cost of the insurance program, canceling the insurance program, or modifying the risk reduction program requirements.

2. The computer program product of claim 1, wherein a single insurer offers the insurance program.

3. The computer program product of claim 1, wherein several insurance providers underwrite the insurance program.

4. The computer program product of claim 1, the method further comprising providing feedback to the healthcare facility regarding compliance with the insurance program.

5. The computer program product of claim 1, wherein further comprising providing the score to the healthcare facility.

6. The computer program product of claim 1, wherein receiving the results of the risk reduction program to identify conformance of the healthcare facility with the requirements of the insurance program is performed after the insurance program is issued to the healthcare facility.

7. The computer program product of claim 1, wherein the interested third party is an insurance underwriter.

8. The computer program product of claim 1, wherein the interested third party is a reinsurer.

9. A method for creating an insurance product for an insured healthcare facility while minimizing insurance risks and reducing premium costs, said method comprising:
providing a risk reduction program to an insured healthcare facility;
establishing an insurance product that requires participation in the risk reduction program;
distributing the insurance product to the healthcare facility;
monitoring the healthcare facility to determine whether the healthcare facility is meeting requirements of the insurance product, including satisfactory performance in the risk reduction program;
determining, by a computer, a conformance of the insured healthcare facility to the requirements of the insurance product;
attributing a numerical score to the conformance of the insured healthcare facility to the requirements of the insurance product;
providing the numerical score to an interested third party; and
responsive to determining the conformance is unsatisfactory, enforcing the requirements of the insurance product by employing countermeasures to assist the healthcare facility in meeting the requirements of the risk reduction program.

10. The method of claim 9, further comprising offering reduced premiums, reduced risk of claims by adherence assurances, and an increased standard in provided services for compliance with the requirements of the insurance product.

11. The method of claim 9, wherein distributing the insurance product to the healthcare facility comprises distributing the insurance product through an authorized broker.

12. The method of claim 9, wherein monitoring the healthcare facility to determine whether the healthcare facility is meeting the requirements of the insurance product is performed after the insurance product is issued to the healthcare facility.

13. A system for providing improved performances for a target entity, the system comprising the components of:
    a computer;
    an independent program catalyst that is operative to:
        select risk reduction program requirements for a target entity, designed to reduce risks of accidents associated with the healthcare industry, wherein participation in a predetermined insurance program is dependent on the target entity's agreement in advance to meet the risk reduction program requirements, and wherein the program catalyst is independent from an insuring entity providing the insurance program;
        implement procedures directed towards assisting the target entity in meeting the risk reduction program requirements;
        monitor the results of the target entity to identify the conformance to the risk reduction program requirements; and
        attribute, by the computer, a score to the monitored results; and
    a web-enabled software solution for providing the monitoring results and the scores to the target entity, the independent program catalyst, and an interested third party.

14. The system of claim 13, wherein said score comprises an indication of the target entity's conformance with said risk reduction program requirements.

15. The system of claim 13, wherein the program catalyst is further operative to provide feedback to the insuring entity regarding said monitored results and said score.

16. The system of claim 15, wherein the program catalyst provides feedback to the insuring entity by utilizing the web-enabled software.

17. The system of claim 13, wherein the independent program catalyst monitors the results of the target entity to identify the proximity to meeting the risk reduction program requirements after the predetermined insurance program has been issued to the target entity.

18. A method for improving performance of a healthcare facility by reducing risks of accidents, the method comprising:
    determining insurance program requirements designed to reduce risks of accidents associated with the healthcare industry, the insurance program requirements being one or more specific risk reduction activities required for participation in an insurance program;
    executing an insurance relationship between an insurer and the healthcare facility, the insurance relationship requiring an agreement in advance to perform the specific risk reduction activities, as well as actual performance of the specific risk reduction activities during the term of the insurance relationship to reduce insurability risk;
    monitoring the healthcare facility to identify performance of the risk reduction activities by the healthcare facility, wherein the monitoring is performed by a program catalyst that is independent from the insurer of the insurance program;
    providing, by a computer, risk reports from the program catalyst to the insurer describing the conformance to the insurance program requirements by the healthcare facility; and
    modifying the insurance program after entry into the insurance relationship responsive to determining the healthcare facility fails to adequately perform the risk reduction activities.

19. A computer program product embodied in a non-transitory computer readable medium, the computer program product comprising an algorithm adapted to effectuate a method for reducing risks of accidents in a healthcare facility, the method comprising:
    entering into a contractual relationship with a healthcare facility to provide a risk reduction program for the healthcare facility, wherein the risk reduction program is a contractual condition of a predetermined insurance product offered to the healthcare facility by an independent insurer at a guaranteed reduced cost;
    implementing procedures specifically directed to assist the healthcare facility in meeting requirements of the predetermined insurance product during the insurance term of the insurance product, thereby reducing risks of accidents associated with the healthcare industry;
    monitoring the healthcare facility's performance in the risk reduction program; and
    reporting the healthcare facility's performance in the risk reduction program to the independent insurer.

* * * * *